(No Model.)
G. I. AP ROBERTS.
TRUNK.
No. 362,868. Patented May 10, 1887.
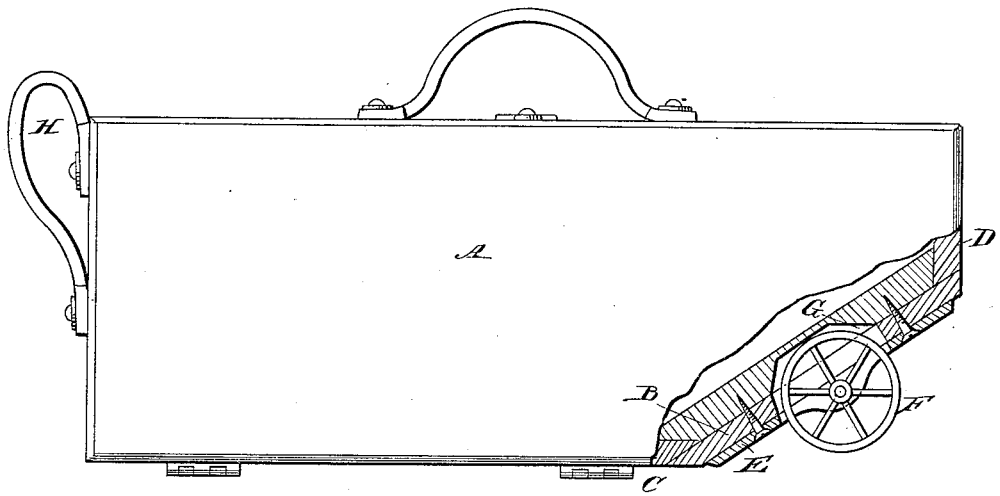
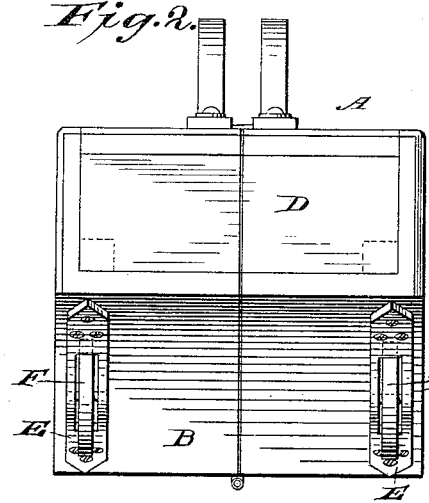 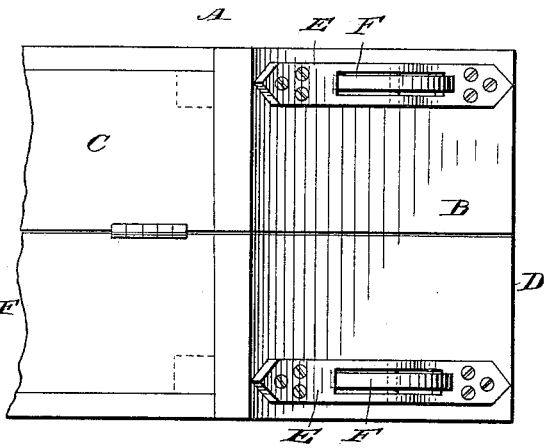
WITNESSES:
George Binkenburg
C. Sedgwick
INVENTOR:
G. I. Ap Roberts
BY Munn & Co
ATTORNEYS.

UNITED STATES PATENT OFFICE.

GWILYM IOAN AP ROBERTS, OF RIVER FALLS, WISCONSIN.

TRUNK.

SPECIFICATION forming part of Letters Patent No. 362,868, dated May 10, 1887.

Application filed March 13, 1887. Serial No. 229,616. (No model.)

*To all whom it may concern:*

Be it known that I, GWILYM IOAN AP ROBERTS, of River Falls, in the county of Pierce and State of Wisconsin, have invented certain new and useful Improvements in Trunks, of which the following is a full, clear, and exact description.

The object of my invention is to provide a new and improved trunk which can be easily and conveniently moved about.

The invention consists of a trunk having a part of its bottom inclined upward and of a wheel or wheels secured to the said inclined part.
The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of my improvement with parts in section. Fig. 2 is an end elevation of the same, and Fig. 3 is a bottom view of part of the same.

The trunk A, of any approved construction, is provided on one end with an inclined bottom, B, extending upward from the bottom C of the trunk to one end, D. On the bottom B are secured one, two, or more bearings, E, each carrying a wheel, F, projecting partly outward from the said bottom and partly into a recess, G, formed in the said bottom B. The trunk A is also preferably provided on the end opposite to the inclined bottom B with a handle or handles, H.

The inclination of the bottom B is so arranged and the wheel or wheels F of such a diameter that when the trunk stands on its bottom, as shown in the drawings, or on its end, the wheels F do not touch the ground, and are thus protected from injury.

When it is desirable to move the trunk, the operator lifts the trunk at the end having the handles H, so that the bottom C of the trunk is lifted off of the ground, and the trunk is now supported by and rests on the wheels F, which, by lifting one end of the trunk, are brought in contact with the ground or floor. The trunk can now travel forward or backward by being pushed or pulled by means of the handles H, the wheels F traveling on the ground or floor. The invention is also applicable to sample-cases, tool-chests, &c.

Having thus described my invention, what I claim as new, and desire to secure by Letters Patent, is—

1. The combination, with a trunk having part of its bottom inclined upward, of wheels mounted on the said inclined part of the said bottom, substantially as shown and described.

2. The combination, with a trunk having part of its bottom inclined upward, of bearings secured to the said inclined part of the bottom and wheels mounted in the said bearings, substantially as shown and described.

GWILYM IOAN AP ROBERTS.

Witnesses:
   CHARLES SMITH,
   W. VANNATTA.